United States Patent [19]
Svensson

[11] Patent Number: 5,128,036
[45] Date of Patent: Jul. 7, 1992

[54] WATER CONTAINER ASSEMBLY FOR USE ON A WATER STAND

[76] Inventor: Ron Svensson, 380 Prospect Ave., Suite 12 C, Hackensack, N.J. 07601

[21] Appl. No.: 589,790

[22] Filed: Sep. 24, 1990

[51] Int. Cl.⁵ .............................................. B01F 29/13
[52] U.S. Cl. ...................................... 210/264; 210/265; 210/282; 210/416.3; 210/474
[58] Field of Search ............ 210/264, 265, 282, 416.3, 210/474

[56] References Cited

U.S. PATENT DOCUMENTS

| | | | |
|---|---|---|---|
| 330,404 | 11/1885 | Jewett | 210/265 |
| 417,703 | 12/1889 | Chichester | 210/416.3 |
| 524,827 | 8/1894 | Jones et al. | 210/265 |
| 1,629,269 | 5/1927 | Hagg | 210/282 |
| 1,645,712 | 10/1927 | Meyers | 210/265 |
| 1,917,121 | 7/1933 | Hughson | 210/265 |

*Primary Examiner*—Robert A. Dawson
*Assistant Examiner*—Wanda L. Millard
*Attorney, Agent, or Firm*—Connolly & Hutz

[57] ABSTRACT

A water container assembly for drinking water includes a purifying unit located at the top of a container and mounted within the container. The purifying unit includes at least one filter having an outlet which communicates with the interior of the container. Water may be placed in the top of the purifying unit and then be purified as it passes through the filter and is discharged into the container.

15 Claims, 1 Drawing Sheet

U.S. Patent   July 7, 1992   5,128,036
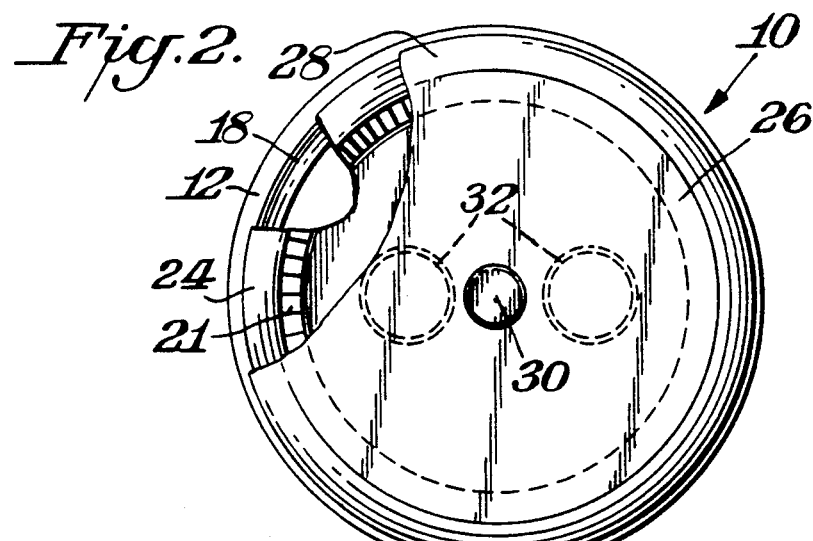
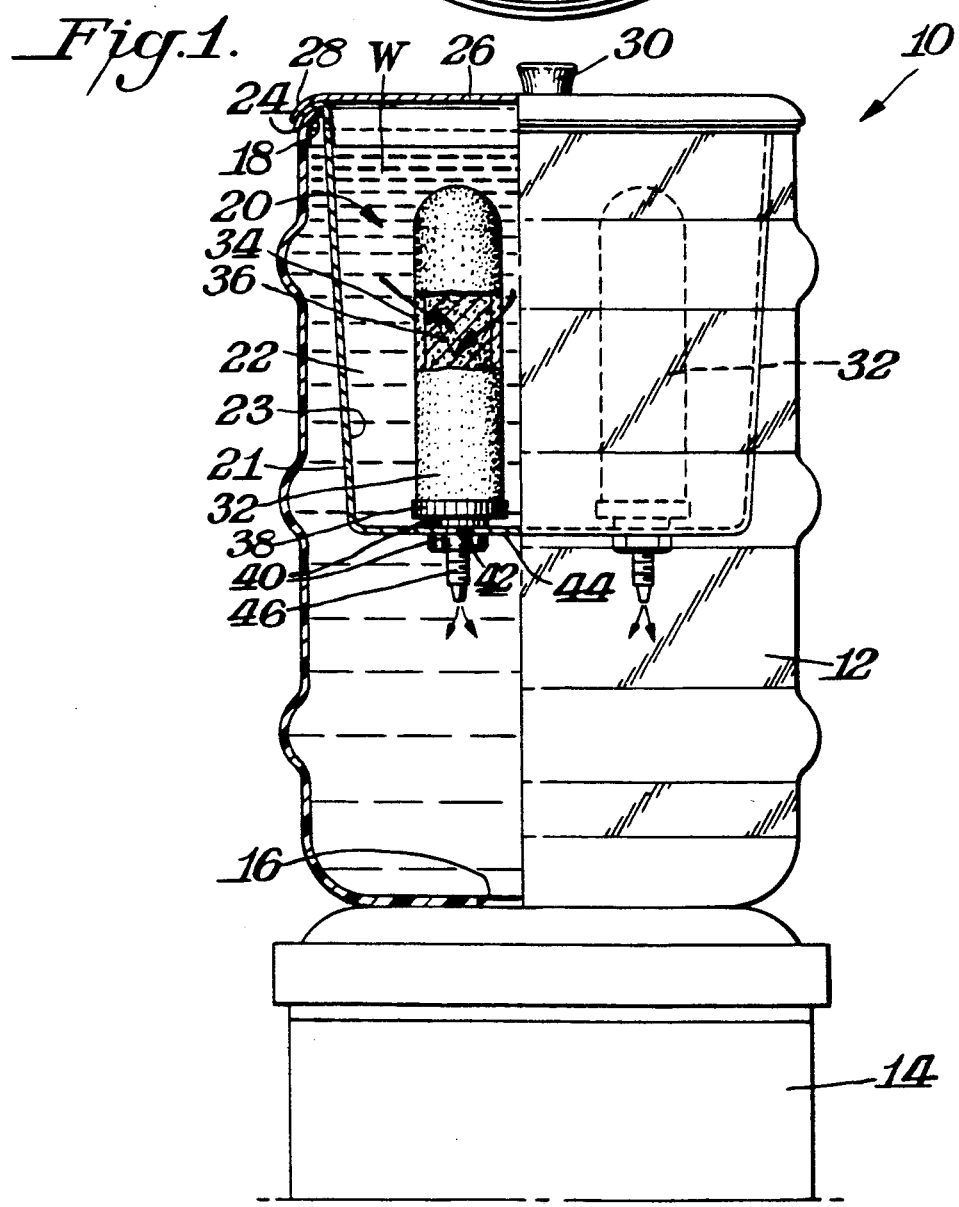

WATER CONTAINER ASSEMBLY FOR USE ON A WATER STAND

BACKGROUND OF THE INVENTION

The use of bottled drinking water has dramatically increased in recent years to a level where the bottled drinking water business exceeds two billion dollars. The sales of bottled water has been increasing at such a rapid rate that by 1993 sales may be expected to reach five billion dollars. This dramatic increase in demand for bottled drinking water is attributable to various reasons, such as the dislike for the taste and the odor of conventional tap water. A further reason is distrust of the water supply.

There are approximately 450 bottling plants producing 600 different brand labels for bottled water in the United States. The general approach in providing such bottled water is to have municipally treated water filtered at a plant before bottling and delivery. The common form of using such bottled water is to provide the consumer with a large container, for example, a five gallon glass or plastic container which is detachably mounted to a refrigerating or chilling unit. This unit typically has a dispenser in the form of a spout through which the chilled water is dispensed into a cup or other container.

There are a number of drawbacks with this type of bottled water. For example, it is inconvenient and expensive to transport such large bottles of water to businesses, condos, apartment dwellers and other security minded businesses. In addition, consumers generally keep one spare bottle so that the consumer will not run out of water. As a consequence it is cumbersome to store the full and empty bottles. Moreover, such bottles are heavy to lift and handle for many consumers, such as women, elderly and handicapped. The consumers are also suspicious of questionable cleaning when the bottles are returnable.

It would be desirable if a low cost system could be provided for conveniently assuring a consumer that there would be a continuous supply of acceptable water without the drawbacks attendant conventional bottled water practices.

SUMMARY OF THE INVENTION

An object of this invention is to provide a water container assembly which avoids the drawbacks indicated above.

A further object of this invention is to provide a water container assembly which is low in cost and dispenses as good or better water than that found in conventional bottled water.

A further object of this invention is to provide a water container assembly that assures the consumer that he or she is not drinking water from a bottle which was previously used or stored in an unsanitary environment.

A still further object of this invention is to provide a water container assembly which can be conveniently filled without heavy lifting and while avoiding bulky storage, delivery problems and security risks.

In accordance with this invention, the water container assembly of the invention includes a water purification unit mounted in the upper portion of a container. The water purification unit includes at least one filter located at the bottom of its housing which communicates with the interior of the container. Tap water is supplied to the housing and passes through the filter before it is discharged into the container. Thus, purified water is continuously supplied into the container for ready dispensing. Only one container need be used since the only replaceable item is the filter.

In a preferred embodiment of this invention a pair of filters are provided as the water purification unit.

In a further preferred practice of this invention the water purification unit includes a frusto-conically shaped housing having an outwardly extending peripheral flange which rests upon the upper edge of the water container.

THE DRAWINGS

FIG. 1 is a side elevational view of a water container assembly, partly broken away in accordance with this invention; and FIG. 2 is a top plan view of the container assembly shown in FIG. 1, partly broken away.

DETAILED DESCRIPTION

The water container assembly 10 of this invention includes a water container 12 mounted on the stand of a conventional cooling, heating or room temperature dispensing unit 14. Although not illustrated unit 14 could include the necessary refrigeration or cooling means to chill the water flowing from container 12 and would also include dispensing spouts so that the chilled water could be dispensed into cups or other containers. Alternatively, the water container 12 could be mounted on a unit or stand 14 which heats the water or dispenses it at room temperature.

Container 12 includes a dispensing opening 16 in its lower wall and is completely open at its upper end except for a slightly inwardly curved rim 18.

In accordance with this invention, a water purification unit 20 is provided in the form of a frusto-conical housing 21 made of any suitable material, preferably stainless steel. Other materials, however, such as plastic, or glass could also be used but are not as desired as stainless steel. Housing 21 has a base 44 and inclined side wall 23 and is open at its top to form a chamber 22 therein. The upper edge of housing 21 has a flared lip 24 which engages over lip 18 of container 12 to prevent dust or other contamination from entering container 12. A removable lid 26 is mounted on the top of unit 20. Lid 26 also includes a downward flare 28 which mates with flared lip 24. Any suitable handle 30 is provided for access to the chamber 22 in the interior of housing 21.

As best shown in FIG. 1, a pair of filters 32 are mounted in chamber 22. Each filter 32 is preferably in the form of an outer ceramic shell 34 impregnated with silver that has a disinfecting action which prevents growth of bacteria and scum on the cartridge surface. The outer shell 34 is preferably made of a ceramic with a highly controlled porosity of about 1 to 5 microns and an active surface area of several thousand square meters. The shell 34 surrounds an inner core of activated carbon 36. Filter 32 may be a commercial filter marketed by Royal Doulton Water Purification, a Division of Industrial Products Limited.

In operation, water W supplied from a conventional tap would enter through the outer ceramic shell 34 where it is stripped of particulates and disease organisms down to, for example, one micron in size. The water continues through the inner core 36 where odors, colors and chemicals, like chlorine are absorbed. Preferably the inner core 36 is made of activated carbon since this is a filter medium superior, for example, to charcoal.

The filters 32 are reusable and with periodic cleaning can be used for example for 6-12 months. Such cleaning might be necessary when the water flow becomes noticeably reduced. Surface accumulation on the cartridge or filter 32 can be removed with a stiff brush in only about 2 minutes. Eventually new filters could be installed and the old filters removed.

The base of each filter 32 includes a rigid mount 38 which supports its respective filter 32. Mount 38 is secured by any suitable coupling device such as nuts 40 on each side of the lower surface of housing 21 to thereby secure the filters in place. An opening 42 extends in the base 44 of housing 21 so that the purified water may flow through the couplers 40 and opening 42 and be dispensed from hollow tube 46 under the influence of gravity. As illustrated, hollow tube 46 is externally threaded for engagement with internally threaded couplers 40.

In operation lid or cap 26 would be removed by lifting handle 30 to expose the interior of chamber 22. Tap water would then be poured into chamber 22. Preferably chamber 22 is of equal capacity to the remainder of container 12. The water would pass by gravity through filters 32 and be discharged into container 12 for storage. Water would then be dispensed through the conventional spouts on the water stand 14.

Container 12 is preferably made of a transparent material, such as glass or plastic which permits the consumer to readily inspect the quantity of water in the container. When container 12 is full the water would also be located in the upper portions of container 12 surrounding chamber 22. As the level of water drops to a point approaching or below the base 44 of chamber 22, the consumer would know that it is time to replenish the water supply by adding more tap water into chamber 22. Accordingly, it is not necessary for chamber 22 to be transparent to provide the consumer with a ready visual indication of the level of water in chamber 22 since that level would be the same as the level of water surrounding chamber 22. Thus, the frusto-conical shape not only permits easy insertion of housing 21 of the water purification unit into container 12, but also provides a volume of water around the water purification unit that is readily visible to permit the consumer to know when it is time to add more water to the purification unit 20.

What is claimed is:

1. A water container assembly for use on a water stand comprising a container for mounting on the water stand, a water purification unit in said container, said water purification unit comprising a housing mounted at the top of said container, said water purification unit having mounting means at its upper end, said mounting means being mounted st said top of said container with essentially all of said water purification unit being disposed within said container, the interior of said housing defining a chamber, an inlet at the upper portion of said chamber to permit tap water to be inserted into said chamber, a filter unit in said chamber, and said filter unit communicating with the interior of said container whereby the tap water flows by gravity through said filter unit where it is purified and then flows into said container.

2. The assembly of claim 1 wherein said housing is frusto-conically shaped with the larger portion of said frusto-conical shape being located at the top of said container whereby water may flow between the outer surface of said housing and the inner surface of said container.

3. The assembly of claim 2 wherein the upper edge of said housing is outwardly flared, said container being completely open at its upper edge, and said flared edge of said housing being mounted over said upper edge of said container.

4. The assembly of claim 3 wherein said housing is completely open at its upper end, and a cover detachably closing said open end of said housing.

5. The assembly of claim 4 including a handle on said cover.

6. The assembly of claim 5 wherein said cover terminates in a flared edge which conforms to the flaring of the upper edge of said housing and the upper edge of said container.

7. The assembly of claim 4 including at least

8. The assembly of claim 1 wherein said housing is of generally equal capacity to the capacity of the remaining portion of said container.

9. The assembly of claim 8 wherein said housing is made of stainless steel.

10. A water container assembly for use on a water stand comprising a container for mounting on the water stand, a water purification unit in said container, said water purification unit comprising a housing mounted at the top of said container, the interior of said housing defining a chamber, an inlet at the upper portion of said chamber to permit tap water to be inserted into said chamber, a filter unit in said chamber, said filter unit communicating with the interior of said container whereby the tap water flows by gravity through said filter unit where it is purified and then flows into said container said housing being frusto-conically shaped with the larger portion of said frusto-conical shape being located at the top of said container whereby water may flow between the outer surface of said housing and the inner surface of said container, the upper edge of said housing being outwardly flared, said container being completely open at its upper edge, said flared edge of said housing being mounted over said upper edge of said container, said housing being completely open at its upper end, and a cover detachably closing said open end of said housing, a handle on said cover, said cover terminating in a flared edge which conforms to the flaring of the upper edge of said housing and the upper edge of said container at least two filters mounted to said housing, and each of said filters including an inner core of activated carbon surrounded by a shell of ceramic impregnated with silver.

11. The assembly of claim 10 wherein each of said filters is mounted to said base of said housing by a mount secured to coupling members to said base of said housing, a hole extending through said coupling members and said base, and said hole communicating with a tube exposed to said interior of said container whereby purified water may be discharged into said container from said tube.

12. A water purification unit comprising a frusto-conical housing having a side wall and a bottom wall and an open upper end, at least one filter mounted to said bottom wall of said housing in communication with an opening in said bottom wall of said housing, a discharge tube at said bottom wall of said housing in communication with said opening whereby tap water may be inserted into said housing and purified by passing through said filter to then be dispensed into a container which communicates with said tube, the upper edge of said frusto-conical housing being outwardly and downwardly flared to form a mounting lip for resting on the upper end of a container into which said unit may be disposed, and a cover disposed over the open end of said housing.

13. The unit of claim 12 wherein at least two filters are mounted in said housing.

14. The unit of claim 13 including a handle on said cover.

15. A water purification unit comprising a frusto-conical housing having a side wall and a bottom wall and an open upper end, at least two filters mounted to said bottom wall of said housing in communication with an opening in said bottom wall of said housing, a discharge tube at said bottom wall of said housing in communication with said opening whereby tap water may be inserted into said housing and purified by passing through said filter to then be disposed into a container which communicates with said tube, and each of said filters including an inner core of activated carbon surrounded by a shell of ceramic impregnated with silver.

* * * * *